US006931528B1

(12) United States Patent
Immonen

(10) Patent No.: US 6,931,528 B1
(45) Date of Patent: Aug. 16, 2005

(54) SECURE HANDSHAKE PROTOCOL

(75) Inventor: Olli Immonen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/554,112

(22) PCT Filed: Nov. 10, 1998

(86) PCT No.: PCT/FI98/00869

§ 371 (c)(1),
(2), (4) Date: Jun. 7, 2000

(87) PCT Pub. No.: WO99/25093

PCT Pub. Date: May 20, 1999

(30) Foreign Application Priority Data

Nov. 10, 1997 (FI) .................................... 974186

(51) Int. Cl.[7] .............................................. H04L 9/00
(52) U.S. Cl. .................... 713/151; 713/15; 380/277
(58) Field of Search ............................. 713/150–157, 713/168–176, 181–186; 709/223–230; 455/511; 380/30, 277–279, 283–285, 44; 340/5.26; 705/50, 64, 71

(56) References Cited

U.S. PATENT DOCUMENTS

| | | | | |
|---|---|---|---|---|
| 5,196,840 A | * | 3/1993 | Leith et al. | ............... 340/5.26 |
| 5,371,794 A | | 12/1994 | Diffie et al. | |
| 5,588,060 A | * | 12/1996 | Aziz | ........................... 380/30 |
| 5,638,446 A | | 6/1997 | Rubin | |
| 5,825,890 A | * | 10/1998 | Elgamal et al. | ............. 713/151 |
| 5,949,882 A | * | 9/1999 | Angelo | ....................... 713/185 |
| 6,081,900 A | * | 6/2000 | Subramaniam et al. | ..... 713/201 |
| 6,826,690 B1 | * | 11/2004 | Hind et al. | .................. 713/186 |
| 2002/0166049 A1 | * | 11/2002 | Sinn et al. | .................. 713/175 |
| 2002/0174238 A1 | * | 11/2002 | Sinn et al. | .................. 709/229 |
| 2004/0236965 A1 | * | 11/2004 | Krohn | ....................... 713/201 |

FOREIGN PATENT DOCUMENTS

EP 532 231 3/1993

OTHER PUBLICATIONS

Dierks et al, "The TLS Protocol Version 1.0" May 21, 1997, Transport Layer Security Working Group, pp 1-70.*

* cited by examiner

*Primary Examiner*—Ayaz Sheikh
*Assistant Examiner*—Christopher Revak
(74) *Attorney, Agent, or Firm*—Pillsbury Winthrop Shaw Pittman LLP

(57) ABSTRACT

A method for a secure handshake protocol between A and B, connected by a slow channel is provided in which A sends a first message indicating a set of cipher suites with parameters, and its identifier and B selects a cipher suite, obtains A's certificate over a fast connection, verifies A's certificate and obtains A's public key. Next B sends a second message comprising B's certificate, and an indication that B has verified A's certificate, and an indication about the selected cipher suite. A begins to use the selected cipher suite, verifies B's certificate and obtains B's public key. Next A sends a third message indicating that A has verified B's certificate.

10 Claims, 1 Drawing Sheet

SECURE HANDSHAKE PROTOCOL

This is the National Stage of International Application No. PCT/FI98/00869, filed Nov. 10, 1998, which in turn claims priority to Finland Patent Application No. 974186, filed Nov. 10, 1997, the contents of all of which are incorporated by reference.

BACKGROUND OF THE INVENTION

The present invention relates in general to a secure handshake protocol for telecommunications networks. More particularly, the invention relates to a method and an apparatus for providing secure handshake between call parties with minimal overhead before actual data transmission.

Within this application, "TLS" refers to Transport Layer Security. One such protocol is described in "*The TLS Protocol*", May 21, 1997, by Tim Dierks and Christopher Allen, Consensus Development. This document has been published as "draft-ietf-tls-protocol-03.txt", incorporated herein by reference. More particularly, the present invention proposes an improved handshake protocol which is applicable i.a. in protocols like TLS.

A TLS-type protocol comprises several layers, such as:
Upper layer protocols
Handshake protocol/Alert protocol/Application protocol
Record protocol
Transport protocol
Lower level protocols FIG. 1 is based on section 7.3 of said TLS draft protocol, and it illustrates a prior art handshake method. In order to keep the specification consistent with said draft, parties A and B are also referred to as "client" and "server", respectively. (Terms like "hello" and "finished" are also used consistently with said TLS draft.) In step 11, the client A sends a client hello message. This client hello message comprises a list of cipher suites and compression methods supported by the client. Additionally, the message may also comprise a time stamp. In step 12, the server B selects a cipher suite and a compression method. (Optionally, B may also check the timestamp to make sure that the message is not an old message being retransmitted.)

In step 13 the server B responds with a server hello message. The client hello and server hello messages 11 and 13 establish security between the parties, typically by establishing the following attributes: protocol version, session ID, cipher suite and compression method. In connection with the server hello message, the server B sends its own certificate $C_B$ to the client A and it requests the client A to send its client certificate $C_A$ to the server B. In response to this, in step 14 the client A verifies B's certificate and obtains B's public key $E_B$. In step 15 the client A sends B a finished message, indicating that A has been able to verify B's identity. Additionally, A sends its own certificate $C_A$ to B. In step 16, B uses $C_A$ to obtain A's public key $E_A$. In step 17, B sends its own finished message to the client A. In connection with verifying its peer's identity, each party independently calculates a shared secret key for this session. Now both parties have exchanged keys, agreed on a cipher suite/compression method and verified the identity of the other party. In step 18, the client A can start transmitting application data.

An essential component in the above protocol are the certificates $C_A$ and $C_B$. By means of certificates signed by a mutually trusted authority, each party can verify its peer's identity. A certificate comprises at least its owner's identity (A/B) and public key(s) ($E_A/E_B$), period of validity, the issuer of the certificate and the issuer's digital signature. It may also comprise the rights granted to its owner. A suitable mechanism for digital signatures is a reversal of public-key encryption: the issuer signs the certificate with its private key and whoever wants to verify the certificate, does so by using the issuer's public key. A suitable structure for a certificate is specified in ISO standard X.509.

A problem with this prior art handshake protocol is the high overhead required. As seen in FIG. 1, the actual data transmission does not begin until step 18, or after four messages have been transmitted between the parties. In a wireless multiple access system, where the parties A and B are separated by an air interface Um and a public land based mobile network PLMN, the actual messaging is much more complicated than the one shown in FIG. 1. This is because FIG. 1 only shows the actual messages and omits (for clarity) the resource reservation and release steps which are routine for a person skilled in the art, but which are nevertheless indispensable.

DISCLOSURE OF THE INVENTION

Based on the foregoing description, it is an object of the present invention to create a method and suitable network elements (nodes and terminals) for providing a secure handshake protocol with a low overhead, i.e. a small number of messages over the air interface. This object will be achieved with a method and network elements which are characterized by what is disclosed in the appended independent claims. Advantageous embodiments of the present invention will be presented in the dependent claims.

The invention is based on a novel distribution of operations between the parties A and B. In addition, some messages over the air interface can be eliminated by using a land-based certificate store or service, and performing an inquiry to this store. Further, the invention is based on the vision that the last message of the handshake proper should be sent from A to B, whereby actual data transmission can be concatenated with the last handshake message, whereby the net overhead is minimised.

The invention is applicable to telecommunication systems with a slow and/or unreliable transmission channel acting as a bottleneck between the parties.

BRIEF DESCRIPTION OF THE DRAWINGS

In the following, the invention will be described by means of preferred embodiments with reference to the accompanying drawing, in which.

DETAILED DESCRIPTION OF THE INVENTION

Figure 2:
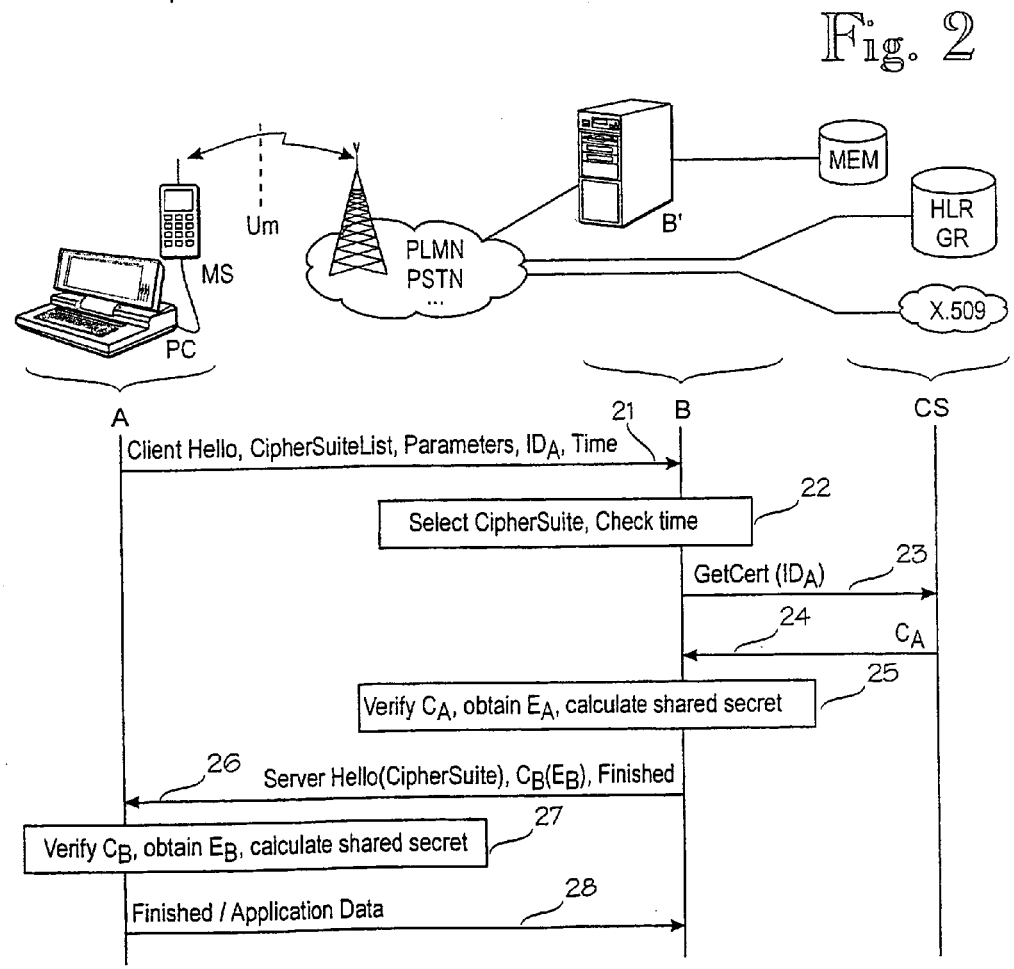
FIG. 2 is a combination wherein the bottom portion is an interleaved signalling diagram/flowchart illustrating an embodiment of the invention and the top portion is a block diagram showing how the inventive functionality can be mapped to various network elements.

Referring now to FIG. 2, an embodiment of the invention will be described. The lower portion of FIG. 2 is an interleaved signalling diagram/flowchart illustrating an embodiment of the invention. The upper portion of FIG. 2 is an associated block diagram, illustrating a possible mapping between call parties and physical network elements.

In step 21 the client A sends a first inter-party message comprising all the elements of the message of step 11. (An inter-party message is a message from A to B or vice versa.) Additionally, the message of step 21 comprises an identifier $ID_A$ of the client A, and encryption parameters (such as random numbers and/or initialisation vectors) if required by any of the indicated cipher suites. The identifier $ID_A$ will be studied later in more detail. In response to the client hello message, in step 22 the server B selects a cipher suite. Preferably, it also checks the timestamp of the message sent by A. In step 23, instead of requesting A's certificate $C_A$ from A itself, the server B uses the $ID_A$ sent by A to retrieve A's certificate $C_A$ from a certificate store CS. The connection between B and CS should be significantly faster than the air interface Um. In step 24, the trustee CS returns A's certificate $C_A$. Alternatively or additionally, B can also maintain a local memory MEM of certificates and omit the inquiry to CS if A's certificate is found in the local memory. In step 25, B verifies $C_A$, obtains A's public key $E_A$ and calculates the shared secret key. In step 26, B sends a second inter-party message to A. The second inter-party message comprises B's certificate $C_B$. It also indicates that B has been able to verify A's certificate. (However, this indication can be an implicit one, meaning that B only sends its certificate if it has verified A's certificate.) In step 27, A verifies B's certificate $C_B$, obtains B's public key $E_B$ and calculates the shared secret key. In step 28, A sends B a third inter-party message comprising a finished message which indicates that it has been able to verify B's certificate.

For clarity, FIG. 2 only shows what happens when the handshake is successful, i.e. both parties act according to the protocol. If a departure from the protocol is detected, this is usually a fatal error and the handshake terminates.

Figure 1:
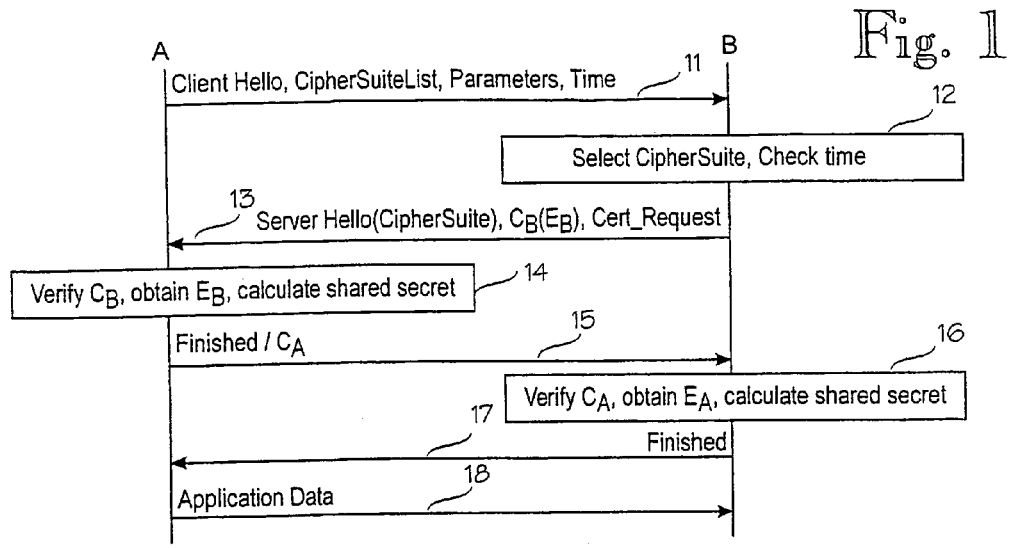
FIG. 1 shows a signalling diagram illustrating a prior art handshake protocol.

It should be noted that the last inter-party message (comprising the finished message in step 28) points from A to B. This is in marked contrast to the prior art handshake shown in FIG. 1. An advantage of this property of the invention is that application data can be concatenated with the third inter-party message in step 28. Thus the effective overhead of the handshake protocol according to the invention is only two inter-party messages, compared to an overhead of four messages in the prior art handshake. In order to achieve this, an appropriate key exchange mechanism must be used. Suitable key exchange algorithms include Diffie-Hellman (DH) with fixed parameters certified with Digital Signature Algorithm (DSA). The DH algorithm can be found in most textbooks on cryptography. Additionally, the original Diffie-Hellman algorithm (DH) is described in U.S. Pat. No. 4,200,770 and the Digital Signature Algorithm (DSA) is a U.S. standard and a de facto international standard. Another good combination is Elliptic Curve Diffie-Hellman (ECDH) with fixed parameters certified with Elliptic Curve Digital Signature Algorithm (ECDSA). The difference between standard DH and ECDH is only different mathematics in obtaining and using encryption and decryption keys. Such differences are not essential to the invention.

Additionally, RSA (Rivest-Shamir-Adlemann) and ECES (Elliptic Curve Encryption Scheme) algorithms can be used with appropriate modifications. With these algorithms, a server key exchange takes place as follows. B generates a random number, which is a pre-master secret, encrypts it with A's public key, and sends the result to A. Thus the message in step 26 would comprise ServerHello, $C_B$, ServerKeyExchange, Finished. Now A decrypts this pre-master secret. This server key exchange procedure resembles a mirror image of the one used in TLS, whereby the handshake can still be accomplished with two messages over the air interface.

The handshake method described above uses public keys. As is well known, public-key cryptography is much slower than symmetric cryptography. Therefore, it is preferable to use the public-key handshake only for exchanging parameters which are used for computing a shared key for symmetric cryptography, such as DES. The parameters (random numbers) sent in message 21 can be used for this purpose.

Although the inventive handshake somewhat limits the available key-exchange mechanisms during the handshake phase, the invention does not limit the available mechanisms used for the actual data transmission. In other words, the invention does not limit the choices available for symmetric cryptography, although it requires that the parameters for the symmetric cryptography first used are exchanged by using a key-exchange mechanism with fixed parameters. The encryption parameters sent in message 21 (and 26) can be combined with private keys to create pre-master secrets which in turn are used to create master secrets, etc. Thus, to each application data message following message 28, a separate message can be concatenated. This separate message can be used for changing the selected cryptography mechanism.

The identifier $ID_A$ of client A should be unique to each A. Suitable identifiers are e.g. a network number, such as MSISDN or an X.509 number. The $ID_A$ is not protected by the handshake protocol proper, although it may be protected by a lower level protocol. Therefore, it is preferable to create the $ID_A$ using a one-way function, such as a hash function. One-way functions are functions that are much easier (at least by several orders of magnitude) to perform in one direction than in the reverse direction. Examples of one-way functions are multiplying large prime numbers, discrete exponentiation, elliptical functions and hash functions. The advantage of one-way functions is that they hide the identity of A from possible eavesdroppers. As is well known, hash functions reduce information. Hashed numbers are thus not necessarily unique. However, a good combination is achieved by using a hash of the client's public key $E_A$ and assigning public keys such that they do not produce identical hash values.

The upper portion of FIG. 2 shows how the functionality of the invention can be mapped to various network elements. The invention can be used in a wireless communication system, such as a mobile communications system. The client A can be a mobile station MS, possibly having a portable computer PC connected or integrated thereto. The server B can be a computer B' providing financial services, or granting access to confidential information, etc. A and B can communicate over an air interface Um and via a public land based mobile network PLMN, possibly also via a public switched mobile network PSTN.

The trustee CS could be implemented in one of the registers of the PLMN, such as a home location register (HLR), or a GPRS register GR. Alternatively, the trustee services can be implemented as disclosed in said ISO standard X.509.

Instead of retrieving A's certificate from CS, or in addition to it, B can maintain a local memory MEM of certificates and omit the inquiry to CS if A's certificate is found in the local memory. B can e.g. be connected to a local area network and the certificates of all the clients A are maintained over the local area network. A local memory MEM can also be used as a cache memory for storing recently used certificates. In real-time applications, if a certificate is revoked, the computer B' must be informed and it must also delete the revoked certificate from its cache.

An important advantage of the invention is that the overhead over the slow communications channel, such as the air interface, can be halved compared to prior art protocols. Another advantage is that the client's certificate $C_A$ does not have to stored in the client itself. Since the client A is typically a mobile station, its memory capacity is limited. This also reduces the information gained by dishonest third parties in case the client hardware gets lost or stolen, or is used by unauthorised persons. Also, because the client's certificate $C_A$ is not transmitted over the air interface, less information is leaked to possible eavesdroppers.

The invention has been described in its preferred embodiments. However, the specifications for telecommunications technology are developing rapidly. Such developments may require additional modifications to the invention. Therefore, all words and expressions should be interpreted broadly, and they are intended for illustrating rather than limiting the invention as specified in the appended claims.

What is claimed is:

1. A method for a secure handshake protocol between a first party and a second party, connected via a communications channel, wherein each party supports a respective set of cipher suites and for each party, a respective certificate is defined, each of the certificates comprising a public key of its respective owner, the method being characterized in that comprising:

sending from the first party to the second party a first inter-party message indicating the set of cipher suites supported by the first party, parameters required by the cipher suites, and an identifier of the first party;

wherein in response to the first inter-party message, the second party:

selects one of said indicated cipher suites which is also supported by the second party;

uses said identifier to obtain the certificate of the first party over a connection which is significantly faster than the communications channel connecting said parties;

verifies said obtained certificate of the first party and thereby obtains the public key of the first party;

sends a second inter-party message comprising the certificate of the second party, an indication that the second party has verified the certificate of the first party, and an indication about said selected cipher suite;

wherein in response to the second inter-party message, the first party:

begins to use the selected cipher suite;

verifies the certificate of the second party and thereby obtains the public key of the second party;

sends a third inter-party message indicating that the first party has verified the certificate of the second party;

and wherein information not needed for the above steps can be sent from the first party to the second party in the third inter-party message, thus providing a two-way key-exchange and mutual verification with an effective overhead of two inter-party messages.

2. A method according to claim 1, wherein said step of obtaining the certificate of the first party comprises retrieving it from a source external to the second party.

3. A method according to claim 2, wherein said external source is a register of a telecommunications network or a directory service substantially conforming to ISO standard X.509.

4. A method according to claim 1, wherein said step of obtaining the certificate of the first party comprises retrieving it from a local memory.

5. A method according to claim 1, wherein said identifier of the first party is formed by means of a one-way function.

6. A method according to claim 1, wherein said second inter-party message comprises a pre-master secret which the second party obtains by generating a random number and encrypting it with the public key of the first party.

7. A telecommunications apparatus configured to act as a first party in a secure handshake protocol between said apparatus and a second party, said apparatus comprising:

a first party unit, wherein said first party unit is configured to:

send a first message to the second party, said first message indicating a set of cipher suites, parameters required by said cipher suites, and an identifier of the apparatus;

receive a second message from the second party, said second message comprising an indication about a cipher suite selected by said second party, a certificate of the second party, an indication that the second party has used said identifier of the apparatus to obtain and verify a certificate of the apparatus, and;

use the cipher suite indicated by said second message;

verify the certificate of the second party and thereby obtain a public key of the second party; and send a third message to the second party, said third message indicating that the apparatus has verified the certificate of the second party.

8. A telecommunications apparatus according to claim 7, wherein said first party unit is further configured to insert information not needed for the above operations in said third message.

9. A telecommunications apparatus configured to respond to a secure handshake protocol initiated by a first party, said apparatus being connectable to said first party by a communications channel, said apparatus comprising:

a second party unit, wherein said second party unit is configured to:

receive a first message from the first party, said first message indicating a set of cipher suites, parameters required by the cipher suites, and an identifier of the first party;

select one of said indicated cipher suites;

use the identifier to obtain a certificate of the first party over a connection which is significantly faster than said communications channel;

verify said obtained certificate of the first party and thereby obtain a public key of the first party;

send a second message to the first party, said second message comprising a certificate of the apparatus, indicating that the apparatus has verified the certificate of the first party, and indicating said selected cipher suite; and receive a third message from the first party, said third message indicating that the first party has verified the certificate of the apparatus.

10. A telecommunications apparatus according to claim 9, wherein said second party unit is further configured to extract information not needed for the above operations from said third message.

* * * * *

UNITED STATES PATENT AND TRADEMARK OFFICE
CERTIFICATE OF CORRECTION

PATENT NO. : 6,931,528 B1
DATED : August 16, 2005
INVENTOR(S) : Olli Immonen

It is certified that error appears in the above-identified patent and that said Letters Patent is hereby corrected as shown below:

Title page,
Item [56], References Cited, OTHER PUBLICATIONS, please add the following:
-- Park, Chang-Seop, "On Certificate-Based Security Protocol for Wireless Mobile Communication Systems," Dankook University, IEEE Network, September/October 1997, pp. 50-55. --.

Signed and Sealed this

Fifteenth Day of November, 2005

JON W. DUDAS
*Director of the United States Patent and Trademark Office*